J. R. BENTON.
TOOL.
APPLICATION FILED MAY 25, 1920.
1,383,064.
Patented June 28, 1921.
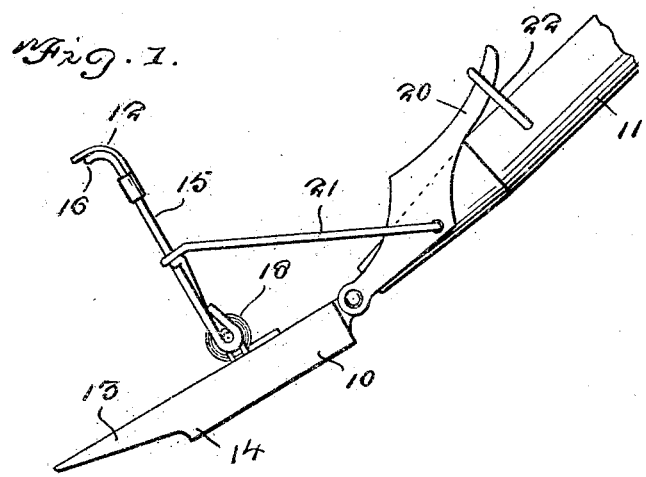
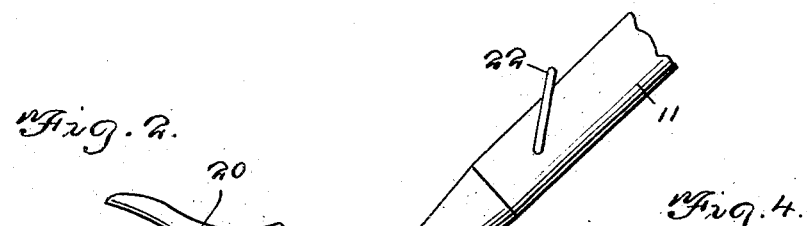
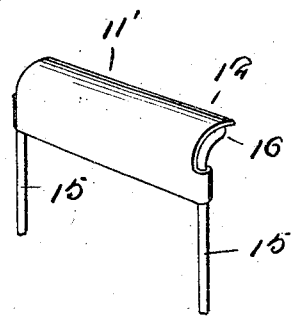
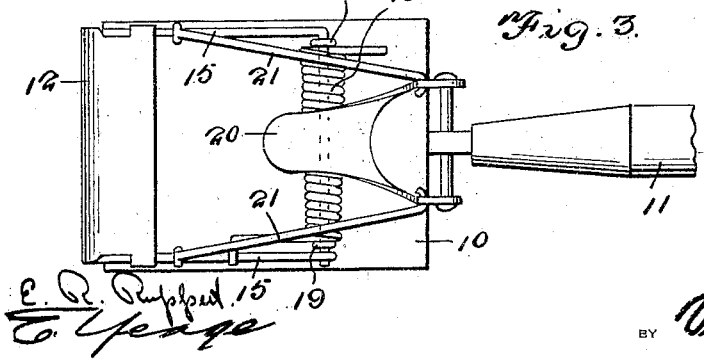
J. R. Benton
INVENTOR
BY Victor J. Evans
ATTORNEY
WITNESS:

UNITED STATES PATENT OFFICE.

JAMES R. BENTON, OF OSWEGO, NEW YORK.

TOOL.

1,383,064. Specification of Letters Patent. Patented June 28, 1921.

Application filed May 25, 1920. Serial No. 384,148.

*To all whom it may concern:*

Be it known that I, JAMES R. BENTON, a citizen of the United States, residing at Oswego, in the county of Oswego and State of New York, have invented new and useful Improvements in Tools, of which the following is a specification.

This invention comprehends the provision of a tool designed to cut and remove grass and dirt at the edge of a lawn or sidewalk, the tool being simple in construction and easy of manipulation for the purpose intended.

In carrying out the invention, I provide a spade upon which is pivotally mounted a cutting element which coöperates with the spade in removing the dirt and grass away from the edge of the walk.

Another object of importance resides in the provision of means for holding the cutting element in an elevated or inactive position against the tension of a spring which is utilized for moving the cutting element to an active position, thus allowing the spade to be properly driven into the ground without any interference on the part of the cutting element.

It is also my purpose to provide a spade having a shoulder to coöperate with the walk so as to limit the movement of the spade in the ground, thereby regulating the depth of the cut.

Other objects and advantages will appear as the following detail description is read in connection with the accompanying drawing, the invention residing in the construction, combination and arrangement of parts as claimed.

In the drawing forming part of this application, like numerals of reference indicate similar parts in the several views, and wherein:

Figure 1 is a view in elevation of the tool constructed in accordance with my invention showing the cutting element elevated or arranged in an inactive position.

Fig. 2 is a similar view showing the active position of the cutting element.

Fig. 3 is a sectional view taken on line 3—3 of Fig. 2.

Fig. 4 is a detail view with the cutting element removed from the spade.

The tool forming the subject matter of my invention embodies a spade 10 including a handle 11 and a cutting element the blade of which is indicated at 12. The component parts of the tool may be constructed from any suitable tool and may also vary in size without departing from the spirit of the invention. The front face of the spade 10 is tapered as at 13 to facilitate the penetration of the blade in the ground, while the blade is also provided with a shoulder 14 extending transversely across the face of the blade for a purpose to be presently described.

The cutting element in addition to the blade 13 includes a yoke upon which the blade 13 is secured for movement toward and away from the spade 10. The yoke is of substantially rectangular formation and includes spaced parallel side members 15 and end members 16. The foremost end member is disposed out of alinement with the opposite end member, and the blade 13 includes a curved portion 11′ which overlies the forward end member of the yoke. This arrangement of parts allows both the forward end member and the curved portion of the blade 12 to project beyond the lower edge of the spade 10 when in active position. The rear end member 16 of the yoke is passed through a coiled spring 18 and also between spaced staples 19 between which the spring 18 is arranged. This end of the yoke is pivoted within the staples, and by reason of the fact that one end of the spring 18 bears against the spade 10 and its opposite end engages the adjacent side 15 of the yoke, the cutting element is thrown from an inactive position to an active position under the influence of the spring 18. A lever 20 is pivoted upon the handle of the spade, said lever being connected with the yoke by means of spaced rods 21. Each rod has one end secured to the lever and its opposite end secured to the adjacent side member 15 of the yoke. Also carried by the handle of the spade, is a loop 22 which is swingingly mounted upon the handle and adapted to engage the lever 20 when the latter is brought to a position shown in Fig. 1, in which position of the lever 20, the cutting element in its entirety is held elevated or spaced from the spade 10.

In practice, the tapered side or face of the spade 10 is arranged adjacent the edge of the walk, and the spade driven into the ground with the cutting element elevated in a manner shown in Fig. 1. The depth of the cut made by the spade 10 is regulated by the shoulder of the spade coming in contact with the top of the walk as will be readily appreciated. After the spade has been thus driven into the ground the loop 22 is swung out of engagement with the lever 20, and the cutting element forcibly moved to an active position under the influence of the spring 18. During the movement of the blade 12 under the influence of the spring, it cuts the dirt and grass away from around the edge of the walk, retaining a considerable portion of this matter between the blade and the rear face of the spade so as to be removed with the removal of the spade. Subsequent to the removal of the spade from the ground, the cutting element is again elevated and arranged in a position as shown in Fig. 1, and the operation repeated.

While it is believed that from the foregoing description the nature and advantages of the invention will be readily apparent, I desire to have it understood that I do not limit myself to the details herein shown and described, and that such changes may be resorted to when desired as fall within the scope of what is claimed.

What I claim is:—

1. A lawn tool comprising a spade, and a spring actuated cutting element pivotally mounted upon one side of the spade and adapted to coöperate with the latter as and for the purpose specified.

2. A lawn tool comprising a spade having a tapered portion, a spring actuated cutting element pivoted upon one side of the spade, designed to project beyond the cutting edge thereof, and means carried by the spade for regulating the depth of penetration in the ground.

3. A lawn tool comprising a spade, a spring actuated cutting element pivotally mounted upon one side of the spade and adapted to coöperate with the latter for the purpose specified, and means for holding said cutting element in an inactive position against the influence of the spring.

4. A lawn tool comprising a spade having a tapered portion, a spring actuated cutting element pivotally mounted upon one side of the spade and designed to project beyond the cutting edge thereof, a transverse shoulder formed on the opposite side of the spade, and means for holding said cutting element in an inactive position against the influence of said spring.

5. A lawn tool comprising a spade, a spring actuated cutting element pivotally mounted upon one side of the spade and designed to project beyond the cutting edge of the spade, and means for holding the cutting element spaced from the spade against the influence of said spring.

6. A lawn tool comprising a spade, and handle therefor, a spring actuated cutting element mounted upon one side of the spade and designed to project beyond the cutting edge thereof, a lever pivoted upon the handle and connected with the cutting element for moving the latter away from the spade against the influence of said spring, and means on the handle coöperating with said lever for holding said element spaced from the spade.

In testimony whereof I affix my signature.

JAMES R. BENTON.